US008651935B2

(12) United States Patent
Caro et al.

(10) Patent No.: US 8,651,935 B2
(45) Date of Patent: Feb. 18, 2014

(54) ON-LINE COMBINED OPTIONAL INSTANT AND FUTURE DRAW GAME OF CHANCE AND METHOD OF PLAYING SAME

(75) Inventors: Gerard Caro, East Greenwich, RI (US); John Cadigan, Hudson, MA (US); Martin Morrow, Euclid, OH (US)

(73) Assignee: GTech Rhode Island Corporation, West Greenwich, RI (US)

( * ) Notice: Subject to any disclaimer, the term of this patent is extended or adjusted under 35 U.S.C. 154(b) by 1794 days.

(21) Appl. No.: 11/036,595

(22) Filed: Jan. 14, 2005

(65) Prior Publication Data

US 2005/0181858 A1 Aug. 18, 2005

Related U.S. Application Data

(63) Continuation of application No. 09/949,273, filed on Sep. 7, 2001, now abandoned.

(51) Int. Cl.
*A63F 13/00* (2006.01)
*A63F 9/24* (2006.01)

(52) U.S. Cl.
USPC .................... 463/17; 463/20; 463/21; 463/22

(58) Field of Classification Search
USPC ........................................................ 463/16–22
See application file for complete search history.

(56) References Cited

U.S. PATENT DOCUMENTS 4,684,276 A * 8/1987 Frei et al. ...................... 400/630
5,074,566 A * 12/1991 Desbiens ...................... 273/269
5,112,050 A * 5/1992 Koza et al. ...................... 463/17
5,158,293 A * 10/1992 Mullins ...................... 273/139
5,451,052 A * 9/1995 Behm et al. ...................... 273/139
5,588,762 A * 12/1996 Suzuki ...................... 400/582
5,628,684 A * 5/1997 Bouedec ...................... 463/17
5,709,603 A * 1/1998 Kaye ...................... 463/17
5,772,510 A * 6/1998 Roberts ...................... 463/17
5,772,511 A * 6/1998 Smeltzer ...................... 463/17
5,887,906 A * 3/1999 Sultan ...................... 283/94
5,934,671 A * 8/1999 Harrison ...................... 273/139

(Continued)

FOREIGN PATENT DOCUMENTS

GB 2147773 * 5/1985
GB 2148135 * 5/1985

*Primary Examiner* — Melba Bumgarner
*Assistant Examiner* — Marcus Jones
(74) *Attorney, Agent, or Firm* — Sullivan & Worcester LLP; Christopher T. McWhinney

(57) ABSTRACT

A combined future lottery and optional instant game uses a central computer connected on-line with multiple game terminals. The player chooses: 1) a first set of at least one game piece, typically numbers, at one of the game terminals and 2) whether or not to play an instant game. The central computer receives the selections, and stores them. If an optional instant game is selected, the central computer acquires a random second set of at least one number and transmits it to the game terminal. A ticket, whether printed at the terminal or displayed, includes the first and second sets of number(s) and an indication of whether the optional game was selected for play. Matching of one or more numbers in the first and second sets results in a win in any of a variety of numbers games and lotto games. The first selected set of numbers is also used in a future lottery such as a weekly draw lottery. A spacing between the first and second number sets appearing on the ticket, and bracketing of displayed winning amounts on a ticket, deter retailer fraud.

20 Claims, 11 Drawing Sheets

(56) References Cited

U.S. PATENT DOCUMENTS 5,979,894 A * 11/1999 Alexoff .......................... 273/139
6,024,641 A * 2/2000 Sarno .............................. 463/17
6,080,062 A * 6/2000 Olson ............................. 463/42
6,089,976 A * 7/2000 Schneider et al. .............. 463/16
6,183,361 B1 * 2/2001 Cummings et al. ............. 463/18
6,234,899 B1 5/2001 Nulph

* cited by examiner

| Number of Tickets | Odds 1:x | Prize | Prize Pool | Prize Payout |
|---|---|---|---|---|
| 1 | 1,000,000 | $5,000 | $5,000 | 0.50% |
| 10 | 100,000 | $500 | $5,000 | 0.50% |
| 25 | 40,000 | $100 | $2,500 | 0.25% |
| 100 | 10,000 | $50 | $5,000 | 0.50% |
| 250 | 4,000 | $20 | $5,000 | 0.50% |
| 500 | 2,000 | $10 | $5,000 | 0.50% |
| 100,000 | 10 | $5 | $500,000 | 50.00% |
| 100,886 | 9.91 | | $527,500 | 52.75% |

FIG. 11

*Pick 3*

| Match | Odds 1:x | Prize | Prize Payout |
|---|---|---|---|
| 3-Digit Straight. | 1,000 | $500 | $50.00% |
| 3-Way Box | 333 | $166 | $49.80% |
| 6-Way Box | 167 | $84 | $50.40% |
| Straight/Box 3-Way | 1,000 333 | $666 $166 | $49.90% |
| Straight/Box 6-Way | 1,000 167 | $584 $84 | $50.20% |
| Front Pair | 100 | $50 | $50.00% |

*Pick 4*

| Match | Odds 1:x | Prize | Prize Payout |
|---|---|---|---|
| 4-Digit Straight. | 10,000 | $5,000 | $50.00% |
| 4-Way Box | 2,500 | $1,250 | $50.00% |
| 6-Way Box | 1,667 | $834 | $50.04% |
| 12-Way Box | 833 | $416 | $49.92% |
| 24-Way Box | 417 | $208 | $49.92% |
| Straight/4-Way Box | 10,000 2,500 | $6,250 $1,250 | $50.00% |
| Straight/6-Way Box | 10,000 1,667 | $5,834 $834 | $50.02% |
| Straight/12-Way Box | 10,000 833 | $5,416 $416 | $49.96% |

FIG. 12

ON-LINE COMBINED OPTIONAL INSTANT AND FUTURE DRAW GAME OF CHANCE AND METHOD OF PLAYING SAME

FIELD OF THE INVENTION

The present invention relates to games of chance and a method of, and system for, playing the games. More precisely, the invention relates to games of chance, e.g., an instant and future draw lottery games, where the play is on-line and uses a single, non-scratch ticket.

DESCRIPTION OF THE RELATED ART

A majority of the states in the United States have legalized public and private lotteries. Typically, these lotteries include numerous variations in two basic formats, i.e., an instant-type and a draw-type lottery. An instant lottery gets its name from the fact that determination of winning can be done virtually instantly. A draw-type lottery, on the other hand, requires the occurrence of another later event, i.e., a scheduled future drawing, to determine whether and which, if any, players have won.

Instant lottery games typically are played using a "scratch ticket" having, a substrate and a removable coating that conceals one or more playing game pieces and related cash prize amounts pre-printed on the substrate. A participant rubs the coating to remove it, or a portion of it, to reveal the underlying game piece and/or prize. Game participants purchase instant lottery tickets for a few dollars, e.g., $1 to $10, at point-of-sale terminals, which are frequently located in grocery stores, convenience stores, smoke shops, and the like. Generally, instant lottery tickets are dispensed from rolls, which are perforated at the juncture between adjacent tickets. The game pieces can include Arabic numerals, symbols, and/or selected playing cards.

In contrast, lottery-type games are played by selecting a pre-determined number of playing game pieces, e.g., integers, from a population of game pieces that are matched to a set of winning game pieces determined randomly, e.g. as during a scheduled drawing event. Game participants purchase lottery tickets, e.g., for a few dollars, at point-of-sale terminals, also located in grocery stores, convenience stores, smoke shops, and the like. Generally, lottery tickets are dispensed from a terminal with a printer. The terminal printer communicates with an on-line central computer (or server, or controller) that maintains a database of all game ticket combinations. Following the draw or other event that determines winning numbers or the like, the central computer determines immediately whether there has been one or more winners. Usually the central computer can also produce a "quick pick" ticket of playing game pieces selected at random from the population of game pieces for those participants who do not want to select their playing game pieces themselves.

There are several versions of lottery-type games. One version requires participants to select both the game pieces and the sequence in which the game pieces will be drawn "straight". For example, a common "Pick Four" game requires game participants to select four numbers, which typically include integers from 0 to 9 with replacement, and the sequence in which these numbers will be drawn. Hence, for example, if a participant selects 1-2-3-4, he or she would win if the winning numbers 1, 2, 3, and 4 are drawn in that sequence. Participants do not win if the winning numbers are drawn in a different sequence, e.g., 2-3-4-1 or if different numbers altogether are selected, e.g., 1-2-3-5. Games which allow a win regardless of the position of the numbers played is commonly termed a "box".

A second version of a lottery-type game, e.g., "Lotto", basically is played in the same manner, i.e., by selecting a pre-determined number of playing game pieces, e.g., integers, and then matching all, or some subset of, the winning game pieces selected during a scheduled drawing event. This version differs from the previous "Pick Four" version in that (i) drawing sequence is not important; (ii) the population of playing game pieces typically is much larger, e.g., integers from 1 to 49; (iii) there is no replacement; and (iv), typically, more playing game pieces are selected.

The number of playing game pieces selected is the same as the number of winning game pieces drawn. The odds of winning the game decrease significantly as the number of game pieces required for a winning combination of game pieces increases. As a result, typically, only a relatively small number of game participants win any prize. Accordingly, possible prizes, e.g., cash jackpots, are usually quite large.

A third version of the lottery-type game, commonly known as "keno", is a hybrid of the second version described above. Keno basically is played in the same manner, i.e., by selecting a number of playing game pieces, e.g., integers, and then matching all or slightly less than all of the winning game pieces selected during a scheduled drawing event. "Keno" games differ from "Lotto" games in that (i) the population of playing game pieces is larger still, e.g., integers from 1 to 80; (ii) participants can choose the number of playing game pieces that they want to match; and (iii) the number of winning game pieces drawn, e.g., twenty (20), is larger than the number of playing game pieces played by participants, e.g., two (2) to ten (10).

Accordingly, the odds of winning at "keno" are better than "Lotto" but prizes, i.e., cash jackpots, are usually smaller. Moreover, "keno" is much less linear than "Lotto", which is to say that one's chances of winning do not end when the first winning number drawn does not match any of the participant's playing game pieces. Accordingly, more participants can win some prize, and game interest is both lengthened and enhanced.

Instant games provide an immediate result, and they are often structured to provide a comparatively large numbers of winners. However, conventional scratch tickets are not compatible with on-line play. Also, once played, the game is over. This lowers game value. Game interest is also lowered by the fact that outcome is predetermined by the pre-printed numbers on the ticket. The player cannot choose the numbers or other game pieces to play. Also, as noted above, for a gaming authority operating such games, instance scratch ticket games also have significant costs associated with the manufacture and distribution of scratch tickets.

Draw lotteries, in contrast, have an enhanced game interest because they can allow a player to select game pieces (e.g. numbers). The game continues, and interest in the game continues, until the draw event. Typically, interest is also enhanced by a larger prize than with a win of an instant game because the wagers of many players are pooled to pay off a small number of winners. Draw lotteries can also be played on-line.

Heretofore there have been attempts to combine the advantages of a future draw game and an instant game. U.S. Pat. Nos. 5,158,293; 5,628,684; 5,772,510; 5,772,511; and 5,934, 671 are exemplary. Most rely on modifications on conventional scratch ticket technology. These known prior games also exhibit one or more of the following charcteristics: 1) sequence play to condition participation in a later game on a win in an earlier game, 2) do not allow the player to select the game pieces (e.g. numbers) to be played, 3) do not allow the same player-selected numbers, whether selected “directly” by the player or through the use of a “quick pick” to be played in both the future lottery game and the instant game, 4) do not make the instant game optional, 5) do not offer this combination of games on a single ticket playable in a single visit to a gaming outlet, and/or 6) are not adapted for play on-line.

Another problem known in the prior art is that retailers that operate remote terminals can void a ticket purchased by a player and misappropriate it to themselves if they can determine before the player that the selected numbers on the ticket are winners. Alteration of prize amounts displayed on a ticket by a retailer to increase a payout and misappropriating the increase are also known.

It is therefore an object of this invention to provide a game, game ticket, game method and same system that combine a future lottery game played on-line with an optional instant game, also played on-line.

A further object is to provide a combination future lottery and optional instant game, method and system that is played with one visit to a remote terminal using a single ticket then can be printed or displayed on screen.

Another object is to provide a combination future lottery and optional instant game, game ticket, method and system that allows the player to select game pieces for both the future lottery game and an optional instant game.

Still another object is to provide foregoing advantages while also providing a variety of lottery and instant game formats, including various instant number games and instant lotto games.

Yet another object is to provide a combine future lottery and optional instant game that is compatible with conventional on-line lottery terminals for lottery games, particularly daily or weekly numbers games.

Still another object is to provide a game ticket and system that control retailer fraud in connection with the sale of a payout on an on-line instant lottery game.

SUMMARY OF THE INVENTION

The combined future lottery and optional instant game of the present invention utilizes a central computer connected on-line with multiple remote game terminals each capable of receiving and transmitting to the central computer player selections of game elements (including a quick pick selection), and receiving and/or displaying the selections and other game information on a ticket. The player selected games pieces are typically a set of numbers to be played in a future draw lottery game and, if chosen for play, an instant game. The chosen “first” set of numbers and the option decision on whether to play an instant game, are input to the system at the terminal, which then transmits the selected numbers and decision to the central computer. The computer stores the selected set in memory as well as the player selection on the instant game option if and only if the instant game option is selected. The central computer selects a second set of winning game numbers using a random number generator, preferably one operating in association with the central computer. The second set of game pieces is the same type, e.g., numbers, as the first, pre-selected, set, drawn from the same field. This second, randomly generated set is matched with the first player selected set to determine if the player has won, and if so, the nature of the prize associated with the winning match or matches. This matching is performed by the computer and by the player when the results of the random number draw are transmitted from the central computer to the terminal where the player inputs his or her selection of game pieces to play. A ticket is displayed at the terminal, and in the presently preferred form, this displaying is a printing of a physical ticket at the remote terminal. The ticket includes a display of the first and second set of game pieces, an indication of whether the instant option is selected (which may be a display of the second set in itself), and may include other game information such as the prize associated with each match.

In one form the indication of selection of the instant game can be the printing or display of a “YES” or “NO” adjacent the name of the instant game. In another form it can be simply the appearance of the second set of numbers on the ticket.

The optional instant game can be a numbers game or a lotto or Keno game. In an instant on-line numbers game, the player can select a set of numbers for a daily (or other periodic) future draw. This selection can be by the player directly, or by the player requesting a quick pick of numbers. If the instant option is selected, this same set of player-selected numbers is also matched against the second set of numbers provided by the random-number generator displayed on the ticket together with the visible indicator of the selection of the instant option. Play of the instant option is ordinarily purchased by placing an additional wager. The player then has multiple play opportunities with his or her selected set of numbers. Prizes for an instant win (e.g. matching one or more numbers) are preferably displayed on the ticket. “Pick 3” and “Pick 4” (a player selection of three or four digits) are common forms of this number game. If the ticket is an instant winner, it can be cashed in immediately. If so, the game system generates a trailer ticket to record the first set of numbers for the future draw.

In the number game, the game pieces are preferably single digit integers selected from the field of integers 0 to 9. In the lotto forms of the game, the player typically selects four or five or six numbers from a field of integers beginning with 1 and ranging from 25 to 100.

In alternate forms of the instant game, the first player-selected set of numbers are matched against single numbers of the second set. Each second set number has an associated prize (more frequently occurring numbers being associated with lower value prizes). The prize is preferably displayed. A typical place on the ticket for this display is adjacent each number. In another form, the player chosen numbers (e.g. daily numbers) are matched to a like number of numbers in the second set. Prizes vary with the number of matches and for their order. In yet another form, the player chooses a first set of digits, e.g. three or four digits, and if the instant game is selected, the central computer randomly draws five sets of three digits, or four sets of four digits. On the “Pick 3”, version, an instant win matches one, two, or three digits in each computer selected set. In the “Pick 4” version, an instant win matches one, two, three or four digits with the player-chosen digits in the first set. The prize structure can also reward matches in position as well as in numerical value.

In an “instant numbers” form of the instant option, a first set of three or four digits is matched to a second like number set of digits drawn by the game system randomly. Matching one, two, three or four digits in the same position (order) is a win. The prizes awarded increase in value with the number of digits matched in the same position.

In a lotto form of the optional instant game, the player chooses a set of numbers, e.g. six. The central computer randomly generates and causes to be displayed on the ticket a lotto-type array of numbers, e.g. three groups of five numbers each. The instant games played by matching the player-chosen first set of numbers with those in each group. Matches of one, two, three, four, or five numbers out of six in a group will win an instant prize of corresponding value. Prize amounts are preferably displayed on the ticket. Numbers in the second set groups can include an image of a joker as a "wild card" number that matches any number in the first set, or any similarly positioned number in the first set. The numbers from the first set are, as with the numbers game embodiments, also used in a future lotto draw. Winning instant tickets can be cashed before the future lotto draw, and a trailer ticket provided to record the player chosen first number set for the specified future lotto draw only.

In another lotto embodiment, the instant lotto game requires the purchase of multiple lotto groups or "boards", each group being, e.g., five randomly generated numbers. The player selects, for example, six numbers to match against these five boards of five numbers each. The pay-out varies with the number of matches made according to a pre-set prize structure displayed on the ticket. In another lotto embodiment, an instant "second chance" game, if the player elects to play the instant game, the game system randomly generates a single "second" set of numbers. These are matched with the first set to determine a win.

In a "key number match" game embodiment of the instant lotto-game, a player-selected set of numbers is matched against a randomly computer-generated second set of numbers. A match of one or more "key" numbers produces a win. The ticket also includes a display of a prize associated with each winning "key" number. The frequency of appearance of the key numbers in the second set is inversely related to the size of the prize.

In all these forms of the instant numbers and lotto games the ticket preferable includes a visual indication of whether or not the instant game is selected for play, as well as a visual indication of the prize associated with each type of win.

The invention also includes a form of ticket and a method of producing a printed ticket that enhance the security of the game system and method against a fraudulent manipulation of the sale or payout by a retailer operating a remote terminal that produces the printed ticket. One security feature is a spacing, preferably a blank space, between a display of the player-selected game pieces and a second set of randomly-generated winning numbers. The first set of player-selected numbers appears on the portion of the ticket that emerges from the terminal as, or after, the ticket is printed. This first set emerges before the space, and before the second set of numbers are visible to the player or the retailer. The size of the blank space is such that the player can see and confirm that the ticket carries his or her selection before either he or the retailer can see the second set and determine if the ticket is a winner. A second feature is bracketing a display of the visual indication of the prize, typically a cash payout adjacent each winning number associated with that payout. The bracketing in the present preferred form consists of dollar ($) signs or equivalent graphics or symbols, to the immediate left and right of the payout amount that control against an alteration of the payout amount after the ticket is printed or displayed.

These and other features and objects of the present invention will become apparent to those skilled in the art from the following detailed description which should be read in light of the accompanying drawings.

BRIEF DESCRIPTION OF THE DRAWINGS

FIGS. 11 and 12 are tables illustrating an exemplary prize structure for the instant game played using the ticket shown in FIGS. 3A-3B and 4A-4B, respectively.

DETAILED DESCRIPTION OF THE PREFERRED EMBODIMENTS

Figure 1:
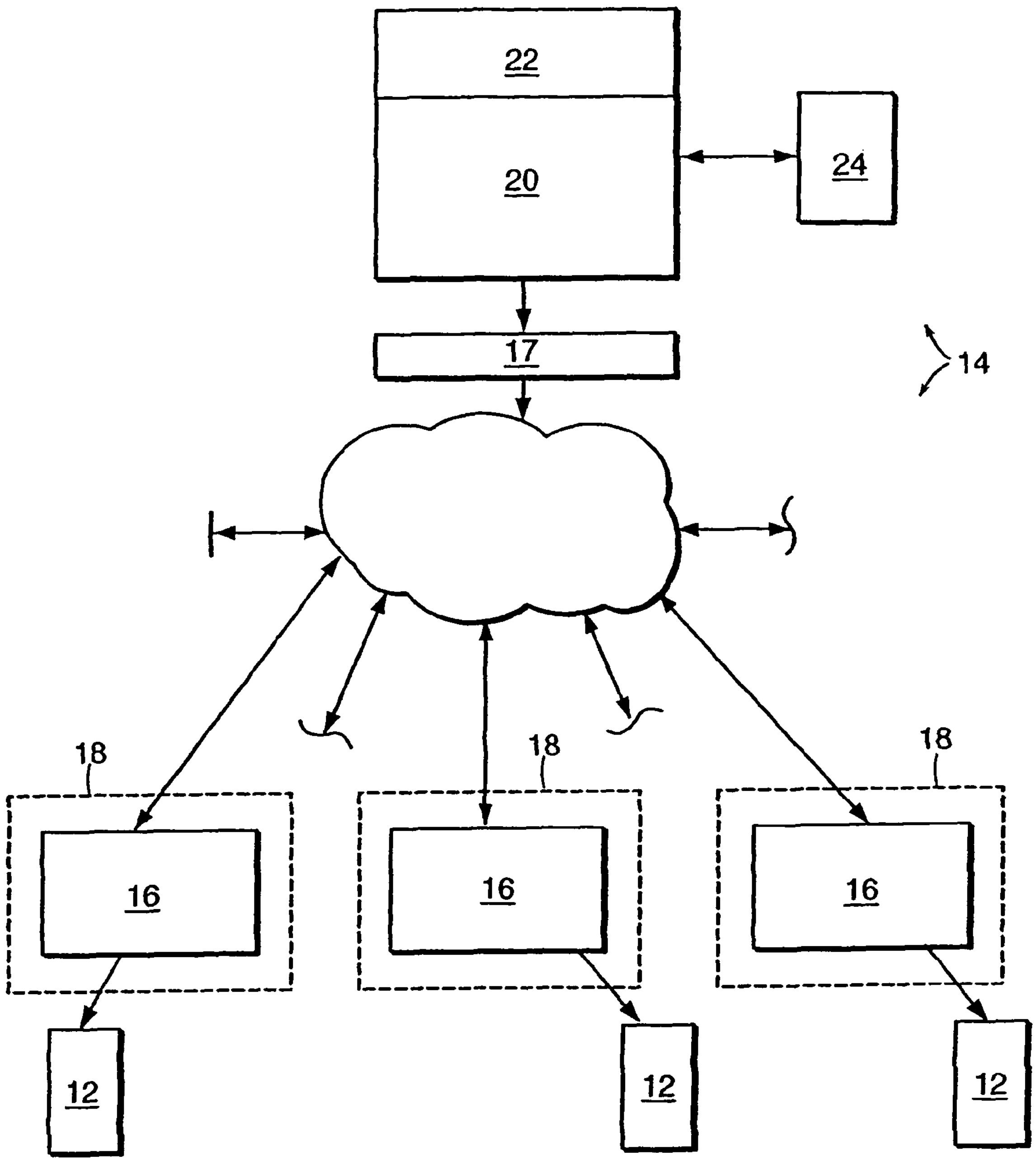
FIG. 1 is a simplified schematic view of an on-line gaming system according to the present invention.

The present invention relates to a game of chance operated as an on-line game that combines an instant lottery game with a future lottery game. As shown in FIG. 1, such an on-line game may be played using game tickets 12 (FIGS. 2A-10) created and distributed to the players by a computer gaming network 14 that includes on-line point-of-sale terminals 16. The terminals print and dispense game tickets 12 to a player. The point-of-sale terminals 16 are located at gaming or retail establishments 18 operated at those establishments by gaming authority agents.

While the invention is described herein with respect to a presently preferred embodiment, operation in conjunction with a conventional on-line daily numbers system utilizing point-of-sale terminals 16 that print tickets 12, it will be understood that the ticket 12 can be a video display and the terminal 16 can be a self-serve ticket vending machine, a personal computer, a Palm brand product, a wireless communications device or the like. Wagers can be placed, and winning results verified and paid off using known on-line techniques compatible with the particular system used. Similarly, communications on the network 14 can be by local area net (LAN), wide area net (WAN), Internet, wireless, and any of the other methods known to those skilled in the art.

The on-line point-of-sale terminals are typically controlled over network 14 by a central computer 20 operated by a gaming authority. The computer 20 connects to the network 14 through an interface 17. The computer includes a memory 22 and operates in conjunction with a random number generator (RNG) 24. The RNG 24 can be a stand-alone device, or a function performed by the computer 20 itself. As a stand-alone, the RNG 24 can be an electronic device, a physical draw of identical numbered balls, or a non-draw event such as the occurrence of some public events, such as a closing stock price on a given day or the score of a sports event.

Blank game tickets, without printed game pieces, are distributed prior to drawings conducted by the gaming authority at regular intervals, such as daily or once a week. Players purchase game tickets to play the game, and the purchase price of the ticket may be, e.g., $1 per ticket.

Each game ticket when played contains at least a first set of game pieces, chosen from a defined collection of game pieces which form the basis for the game. For example, the game pieces may be numbers, letters of the alphabet, characters, or symbols. In the numbers game the field is typically the set of integers 0 to 9. In lotto games the field is typically a larger set of numbers, e.g., 1 to 25 to 1 to 100. For convenience, this specification will refer to the game pieces as numbers. However, this invention is not limited to numbers.

The player selects the numbers to play as a first set 26. This selection of numbers is transmitted over the network 14 from the terminal to the central computers 20 where they are recorded in the memory 22. This operation can be a conventional daily numbers game transaction. The player can actually designate the selected numbers, or he or she can designate a quick pick, asking the computer to select these numbers. As used herein, "player-selected" or "selecting" used with reference to the first number set 26 includes both an actual, direct selection of numbers by the player and player selection of numbers through the selection of a quick pick.

Figure 2A:
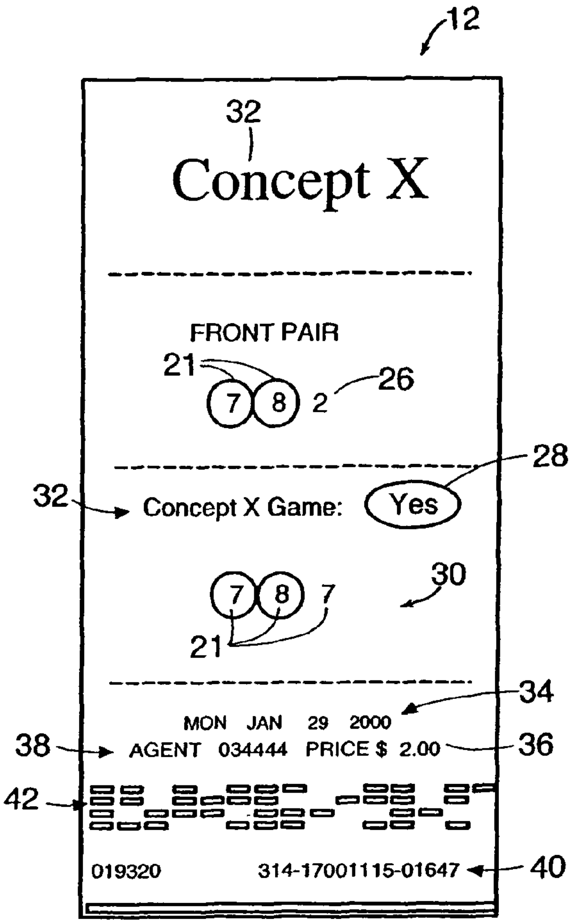
FIGS. 2A and 2B are top plan views of a general form of ticket according to the present invention adapted for play of a future draw game and an instant numbers game issued by the game system shown in FIG. 1.
Figure 2B:
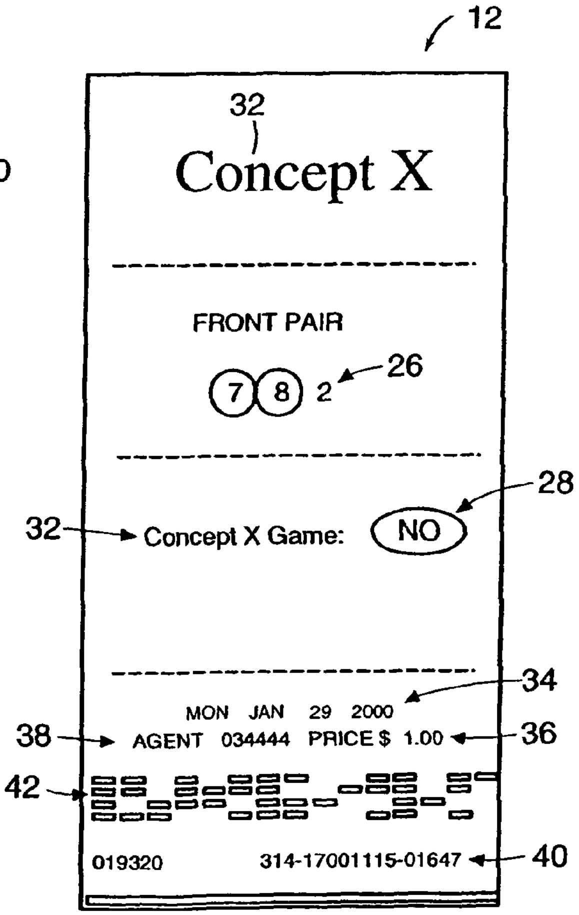

A feature of the present invention is that the player also has the option of playing an instant game, as well as a future lottery game, typically a draw game, by paying a further amount, e.g. $1 or $2, and entering, whether himself or through the agent, a "Yes" or like indication of an intent to play the optional instant game. This selection, a "Yes" or "No" on playing the optional instant game, is also transmitted from the terminal to the central computer 20 where this choice is recorded in the memory 22 along with the other information relating to this wager. The central computer then directs the terminal to print a single game ticket 12 that has printed, or otherwise recorded thereon, the player-selected first set 26 of numbers, and a visual indication 28 of the player's choice as to whether or not to participate in an instant game. As shown in FIGS. 2A and 2B, this indication 28 is the word "Yes" or "No" following a written reference to the play of the instant game; or an equivalent such as the name of the particular instant game being played.

It can, of course, include many other indicia such as a mark in an appropriate box on the ticket, a physical alteration of the ticket, e.g. a hole or clipped edges, or the appearance or non-appearance on the ticket 12 of a second set 30 of numbers used to play the instant game.

As shown in FIGS. 2A-2B this game ticket 12 typically also contains other information pertinent to playing the game, such as the name 32 of the game, a date 34 indicating the date the ticket was purchased, or a future date on which the winning numbers will be drawn, the purchase price 36 for the ticket, an identification number 38 of the agent corresponding to the point of sale terminal from which the game ticket was purchased, a serial number 40 for identifying the game ticket, and a machine-readable code 42, such as a bar code or MICR code. This code may contain any or all of the other information contained on the game ticket, such as the serial number, the date, and the game pieces (numbers) in sets 26 and 30. The machine-readable code may be used by a point-of-sale terminal capable of reading and interpreting such machine-readable code to verify quickly and accurately verify the winning status of the game ticket in conjunction with information stored at the central gaming authority once the winning number have been drawn, and the ticket has been presented for payout.

Play of both the future draw and the instant lottery game, if selected, can use this one ticket 12. Play of the instant game involves matching the player-selected numbers from the first set 26 with a like-type of numbers from the second set 30. The second set 30 is produced from the available field of numbers by the random number generation 24 in the appropriate quantity and array for the play of a selected type of instant game. The set 30 is stored in memory 22 in a manner that relates to this set to a particular ticket/play. The set 30 is transmitted from the central computer 22, over the network 14, to the given terminal 16. The sets 26 and 30 appearing on a given ticket 12 at a given terminal 16 are uniquely associated with that one play of the game. Depending on the type of game being played, there may be one or more number matches between the first and second sets on a single ticket 12.

Matches for the instant game are determined by the player examining the ticket. The central computer also calculates matches, and records the result and the prize associated with a particular "win" result. In general, certain matches, and/or certain quantities and positional order of matches, are associated with different prize values. In general, the larger the number of matches, or matches in a specific order, the greater the prize. The tickets 12 will typically include a visual indication 28 of the prize associated with a particular match, or number of matches, and for matches in a specified order. The prize indication can be a displayed amount of money, a symbol or picture of a prize, and/or a table showing the odds and prize amounts for all possible winning outcomes. If there are no matches, the instant game is lost and the additional purchase price for the option of playing the game is forfeit. However, the player continues to have the opportunity to play, and possibly win, the future lottery game. With the same player-selected set of numbers, play is therefore extended, and play value of the game increased.

If the instant game is won, the player also plays in the future draw. However, if the player wishes to take the instant game prize before the future draw, the winning instant game ticket may be presented to an agent, or otherwise validated and paid off in any known manner. If the winning instant ticket 12 is retained by the gaming authority or its agent, as is usual, the central computer will record the pay out and initiate the issuance of a trailer ticket that includes information previously appearing on the ticket 14 necessary to play the future draw. In particular, the trailer includes the same player-selected first set 26 of game pieces as used in the instant lottery game. The trailer ticket can be like the original winning ticket 14, but without the second set 30 of the instant game.

The instant game can be played in a wide variety of forms. FIGS. 3A-6B illustrate variations on instant numbers games. In every embodiments however, one ticket 12, and one visit to a terminal 16, provide at least two opportunities to win.

Figure 3A:
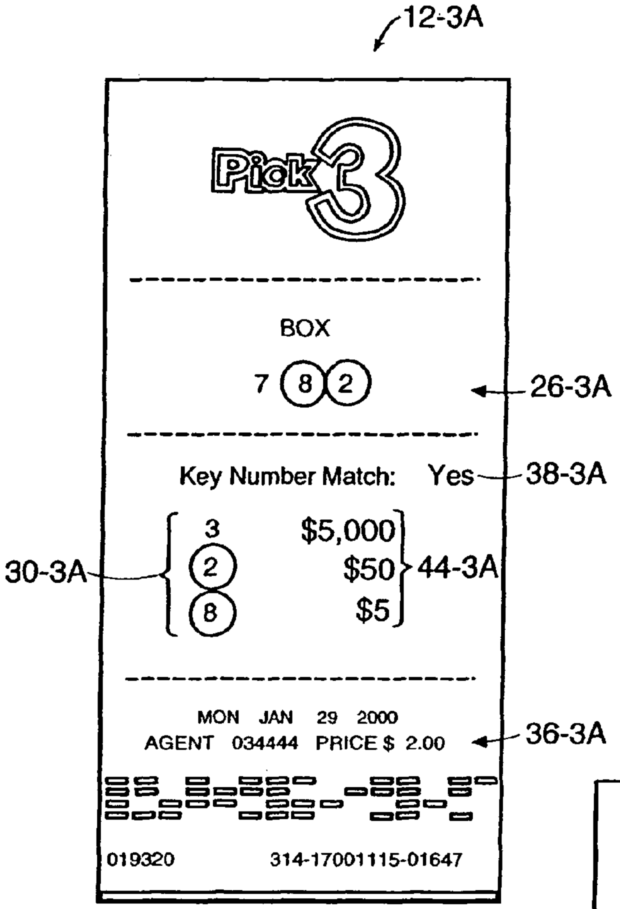
FIGS. 3A-6B are top plan views of alternative embodiments of tickets according to the present invention thus offer optional "Pick 3" or "Pick 4" instant numbers games.
Figure 3B:
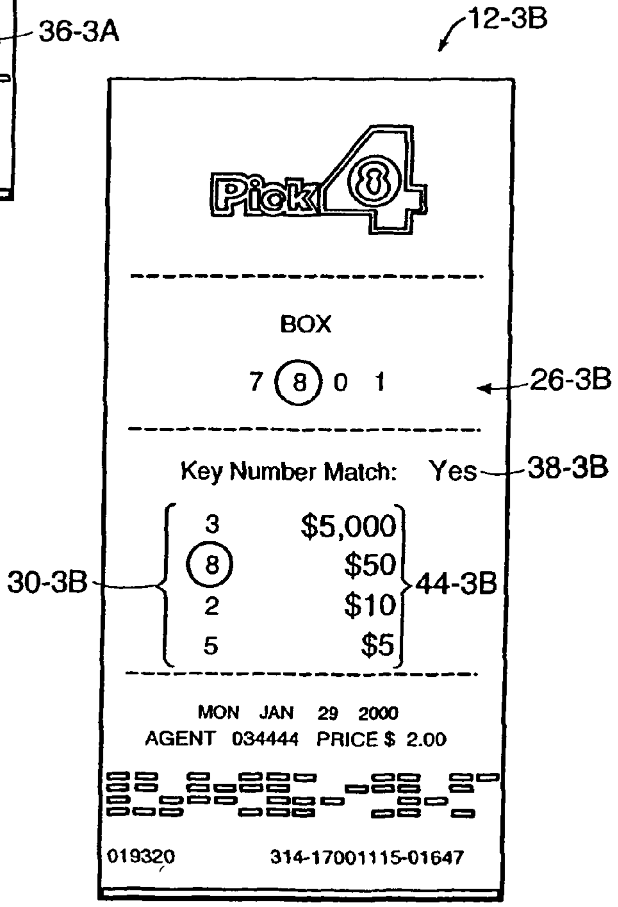

FIGS. 3A and 3B show a ticket 12-3 (like elements in the various embodiments being identified with the same reference number, but distinguished by a "dash" and the Figure number of the specific embodiment) adapted for the play of a "Key Number Match" instant game. The instant game is played for an additional purchase price of $1.00, as reflected in the total price 36-3 being shown as $2.00. Prizes 44-3A and 44-3B are displayed on each ticket 12-3A for a "Pick 3" game and ticket 12-3B for a "Pick 4" game, corresponding to FIGS. 3A and 3B, respectively. In the Pick 3 game, the player selects three numbers to play from the field of 0 to 9 for the daily or other periodic future draw lottery. In the illustrated example, this first set of numbers 26-3A consists of the single digit numbers 7, 8, and 2. The second set 30-3A of numbers displayed on the ticket 12-3A are randomly generated by the lottery authority. The indication 28-3A of a selection to play the instant lottery game is the word "YES" appearing on the ticket after the phrase, "Key Number Match". If play of the instant game is not selected, the indication 28-3A would read, "NO". In that event, the second set 30 may nevertheless be displayed, but the ticket cannot be redeemed for the stated prize if there is a match between numbers in the first and second sets. If the instant game is selected and if there is at least one match, then the player wins the prize appearing adjacent the matched "key" number. As shown, the player has matched the numbers 2 and 8, and wins a total of $55.00. This prized can be redeemed at once, or at a later time. If it is redeemed before the future draw, a trailer ticket is issued.

Note that a winning key number on any one ticket 12 is not necessarily a winning number on any other ticket 12 issued to another player or in another play to the same player. The outcome of the instant game on each ticket is determined by the number selections of that one player for that one play, and the results of the random number draw for that one play. Also, the same player-selected number set 26 is used to participate in a second game, the future draw.

The prizes and winning key-number digits change from ticket to ticket according to a pre-loaded instant prize structure. Exemplary prize structures for the Pick 3 and Pick 4 Key Number Games of FIGS. 3A and 3B are shown in FIG. 11. This structure is based on a pool of 1,000,000 tickets.

FIG. 3B shows a "Pick 4" instant game where the player selects four digits from a field of 0 to 9. The player-selected set 26-2B as shown is 7, 8, 0, and 1. The randomly-generated second set 30-3B as shown is a set 30-3B of a like number of digits drawn from the same field. Match of any one digit, if the instant game option is selected, wins the prize 44-3B shown next to the matched number. As shown, there is a key number match of the digit 8, and this win provides a prize of $50.00 for a ticket purchase price of $2.00, plus the opportunity to participate in the future draw, and perhaps win an additional jackpot prize, typically of a much larger value than available in the instant game.

Figure 4A:
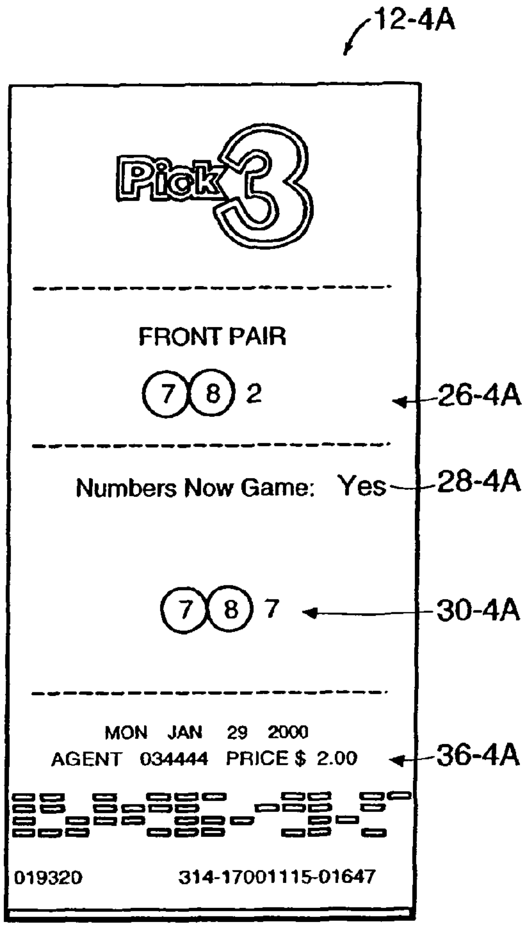
Figure 4B:
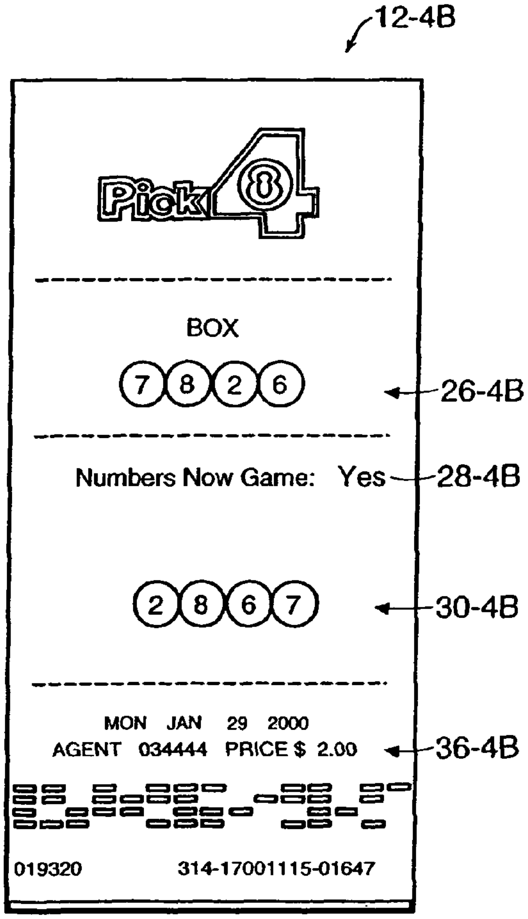

FIGS. 4A and 4B show tickets 12-4A and 12-4B according to the present invention that offer an optional play of an instant "Numbers Now" numbers game in either a Pick 3 format or a Pick 4 format. The play is generally as described above with respect to FIGS. 1-3B. For a $1.00 purchase price one plays only the future draw game and the ticket 12-4A or 12-4B has the word "NO" as the Numbers Now Indicator 28-4A or 28-4B. If the instant game is selected, the price 36-4A or 36-4B is, in the illustrated example, $2.00, and the indicator is the word "YES".

As with the FIG. 3 embodiment, the player selects the first set 26-4A or 26-4B of numbers to be played from the field of 0 to 9, with three digits chosen for Pick 3 and four digits chosen for Pick 4. The second set of numbers 30-4A or 30-4B is randomly drawn and displayed on the ticket, as shown, in an ordered row. The player wins by matching numbers in the first set 26-4A or 26-4B with numbers in the second set 30-4A or 30-4B. The prize structure, as shown in exemplary FIG. 12, for matching the first two numbers of each set, as is the case in FIG. 4A, is $50.00. The prize structure mirrors that of the base lottery game. "Straight" in this prize structure means that the matches are in the same position within their respective sets. "Box" means that there are matches, but they are not in the exact same order.

Figure 5A:
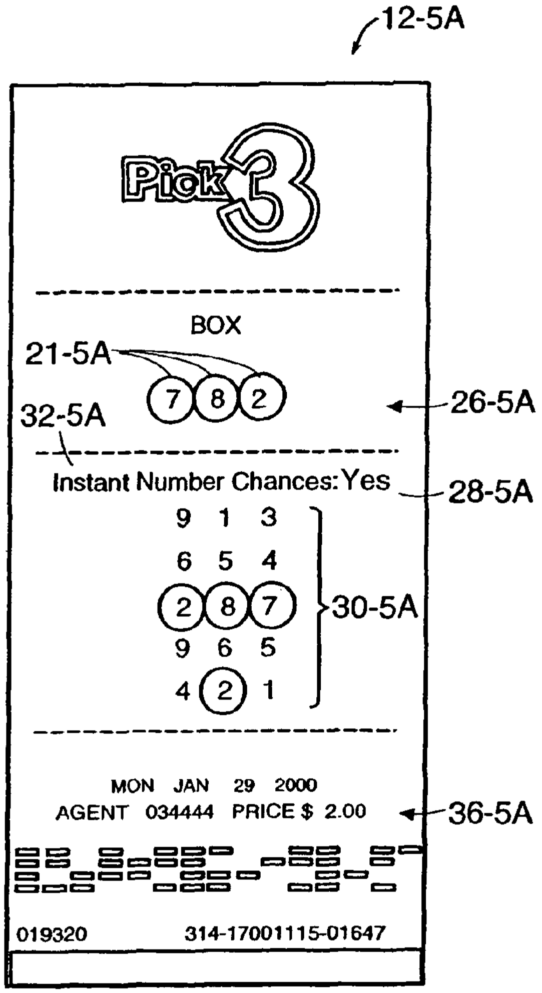
Figure 5B:
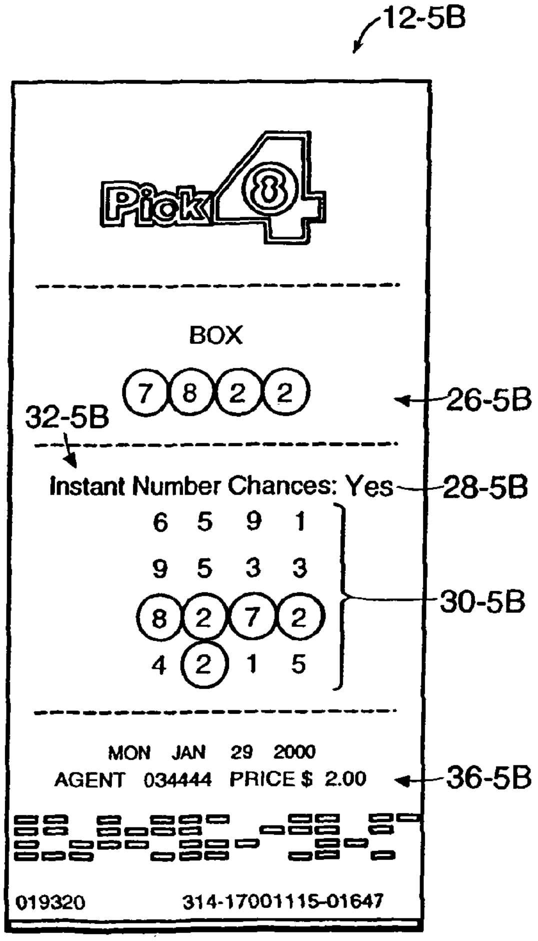

FIGS. 5A and 5B illustrate an "Instant Numbers Chances" instant game according to the present invention in Pick 3 and Pick 4 forms, respectively. As with the foregoing Instant Numbers games, if the player elects to play the optional instant game, the indication 28-5A or 28-5 B on the ticket 12-5A or 12-5B is "YES" following the name 32 of the instant game. The completed ticket 12-5A or 12-5B then has printed on it five sets of three digits (for Pick 3) or four sets of four digits each (for Pick 4). Each of these sets of numbers containing the same quantity of digits as the player-selected set 26-5A or 5B, drawn from the same field, here, 0 to 9. The complete group of randomly generated sets together constitutes the second set 30-5A or 30-5B. A player wins this instant game by matching three or two digits in each set of digits with the first set of digits 26-5A in the Pick 3 game, or by matching four, three or two digits with the first set 26-5B of player selected numbers in the Pick 4 game. The prizes are not printed on the front face of the ticket as in other embodiments because of the complexity of the various winning combinations resulting from this matching. In the illustrated Pick 3 embodiment in FIG. 5A, all three player chosen numbers, 7, 8 and 2 and matched in the third set of the group 30-5A, and the number 2 is matched in the fifth set. The three matches in Pick 3 pays $45.00 on a $2.00 purchase price. The illustrated four digit match in FIG. 5B for Pick 4 pays $500.00 on a $2.00 purchase price.

Figure 6A:
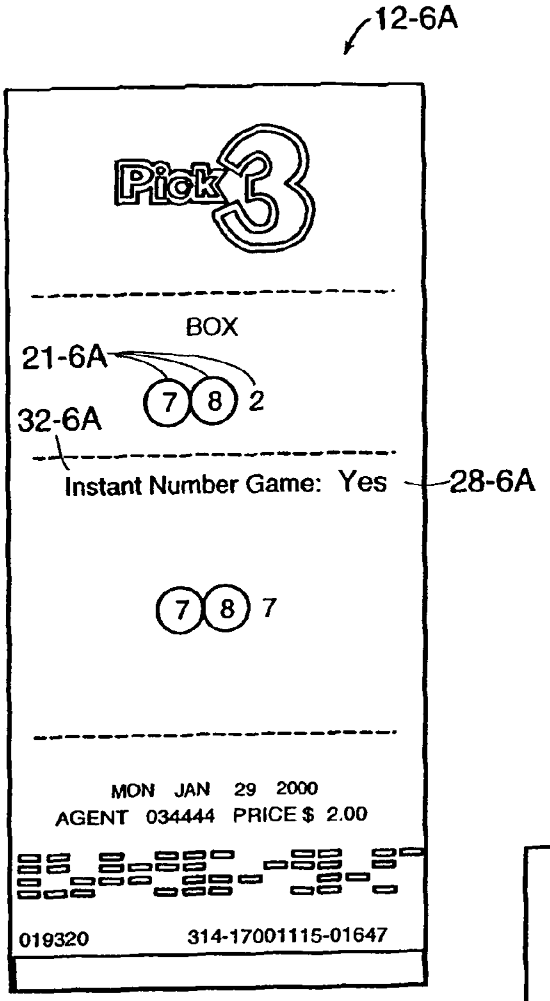
Figure 6B:
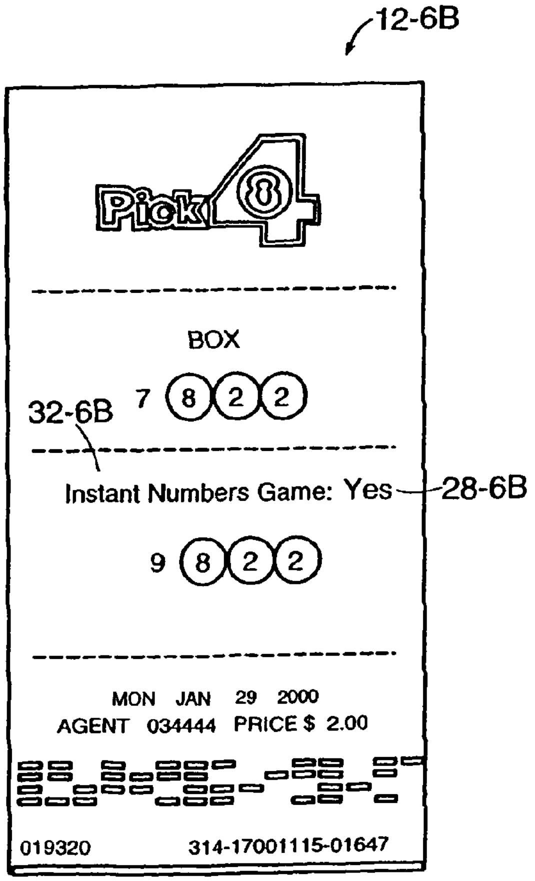

FIGS. 6A and 6B illustrate yet another instant numbers game embodiment of the present invention, termed "Instant Numbers", in Pick 3 and Pick 4 versions, respectively. If an extra $1.00 ticket cost is paid to play the instant game as well as the future draw, then a "YES" indications 28-6A or 6B follows the game name 32-6A or 6B, and a second set 30-6A or 30-6B of numbers is displayed on the ticket, as shown. The number of digits is the same in each set, and they are drawn from the same field, 0 to 9, but the player chooses the first set and the second set is drawn randomly by the game system using the random number generator 24. Again, the instant game is won by matching any three, two or one digits for Pick 3 and matching any four, three, two, or one digits for Pick 4. Prizes are awarded in accordance with the odds and percentage payout set by a pre-selected prize structure of the general type noted above. The prizes are not displayed on the ticket in the exemplary Figures. The odds and payouts for various combinations of wins can be printed on the reverse side of the ticket, or displayed on screen in connection with the play of the game, or otherwise. As shown in FIG. 6A, the player has matched the first two digits in position and wins $10.00 for a $2.00 purchase price, plus the opportunity to also win the future draw. In FIG. 6B, the player has matched the first three digits in position in the Pick 4 version of this instant game, and wins a prize of $40.00 for a ticket purchase price of $2.00. Note that in the Instant Numbers game to win the matching digits must be in the same position in both sets.

FIGS. 7A-10 illustrate tickets according to the present invention that allow play in a future draw, here a lotto draw, and an optional play of an instant lotto game. As with the numbers forms of this invention, these lotto embodiments allow at least two, and in certain versions more than two, opportunities to play with a single ticket. In each of these embodiments, the player selects his or her own set 26 of game pieces, typically six numbers selected from a field of 1 to 25 or 1 to 80. In each of the following examples the price of a ticket to participate in the future lotto draw is $1.00, and the indication 28 of a decision on whether to play the instant lotto game is the word "YES" or "NO" following the name of the instant game. As with the numbers instant game embodiments, a winning instant ticket can be redeemed before the future draw and a trailer ticket is issued for the future draw.

Figure 7A:
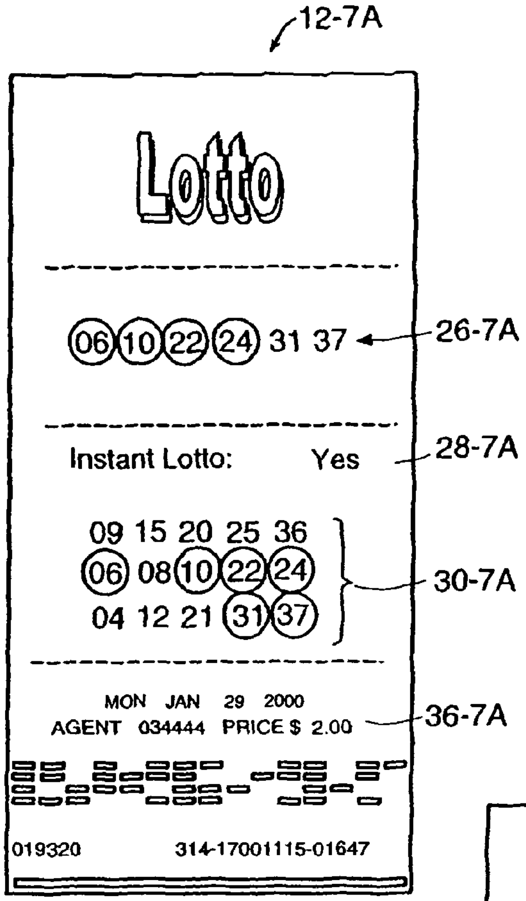
FIGS. 7A-10 are top plan views of alternative embodiments of tickets according to the present invention that offer optional instant lotto games.
Figure 7B:
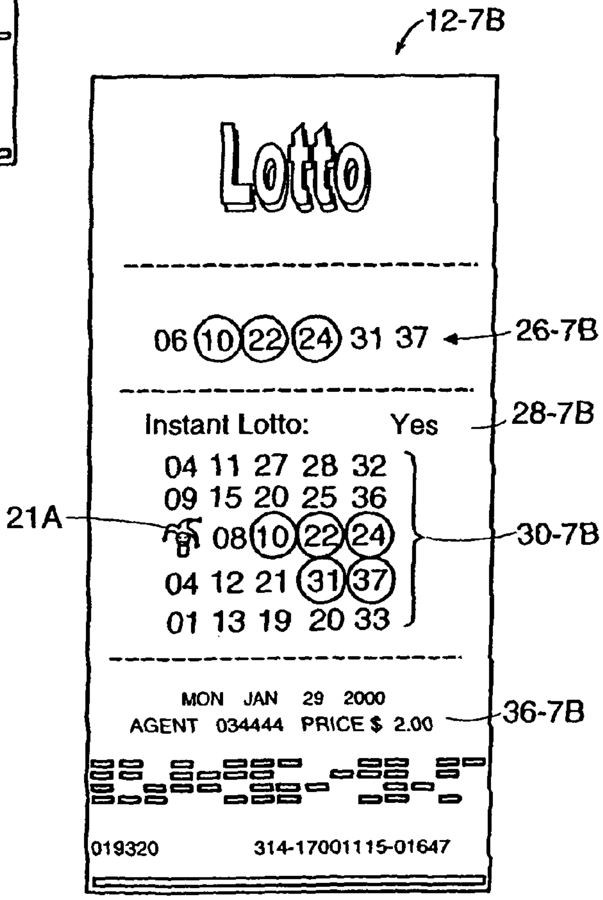

FIGS. 7A and 7B show tickets according to the present invention where the optional instant game is "Instant Lotto" and it has been selected for play. An additional $1.00 is charged to play the instant game; the full ticket price, as shown, is $2.00.

The lotto structure of the instant game provides the possibility of winning a large jackpot prize and multiple chances to play and win. The prizes or prize structure is not shown in FIG. 7A or 7B, but they can be printed or otherwise displayed, e.g. on the reverse side of the ticket. In the illustrated example in FIG. 7A, the first set of player-chosen numbers 26-7A consists of six numbers the set is used for a periodic future lotto drawing, e.g. weekly. The second set of numbers 30-7A are drawn using the random number generator 24 to play the instant lotto optionally selected for play. "Yes" indicator 28-7A after the name 32 "Instant Lotto" on the ticket is a visual indication confirming the selection to play the instant game.

The play of the instant game involves comparing each group of five numbers in the three rows or groups shown in FIG. 7A to the number in set 26-7A. Prizes are awarded for matching five, four, three, or two numbers in any row with the numbers in set 26-7A. On the illustrated example, the numbers "6", "10", "22", and "24" match numbers in the second row of set 30-7A. This win has an associated prize payout of $70.00. Matching the numbers "31" and "37" in the last row has a payout of $1.00. The total prize for these wins is then $71.00.

FIG. 7B shows a variation on the Instant Lotto game of FIG. 7A where set 30-7B includes five rows of five numbers each and there is a wild card or "joker" 21*a* in the first position in the third row. Matches of five, four or three numbers with the set of 26-7B six numbers chosen by the player constitutes a win. In the illustrated example of FIG. 7B, there are three number matches in the third row, plus the wild card, for a four number match. This wins $30.00. The two matches in the fourth row do not qualify as a win in this embodiment. As with the preceding numbers game embodiments, these and other lotto instant game and future draw game tickets can be redeemed at any time prior to the draw for the prize or prizes won. A trailer ticket is issued for the draw lottery.

Figure 8A:
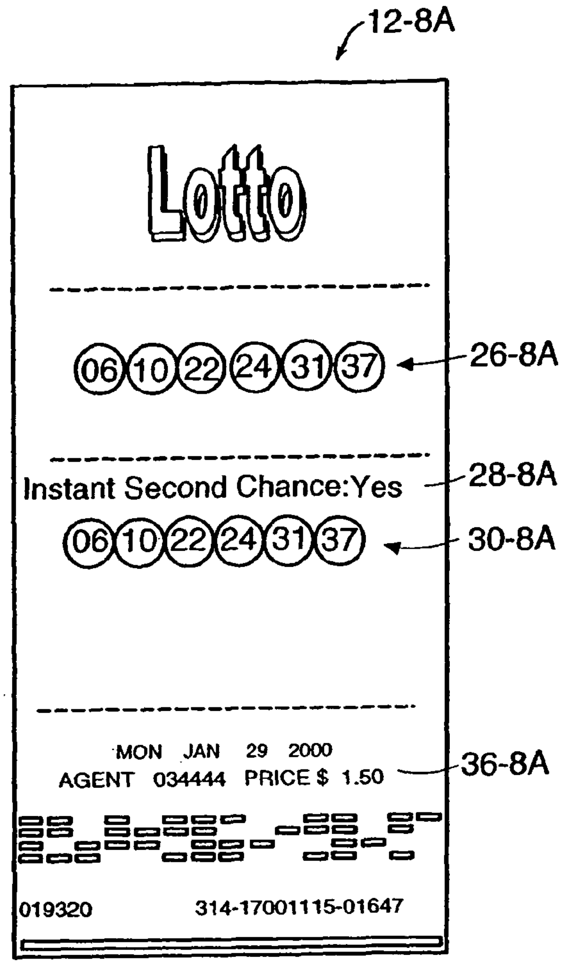
Figure 8B:
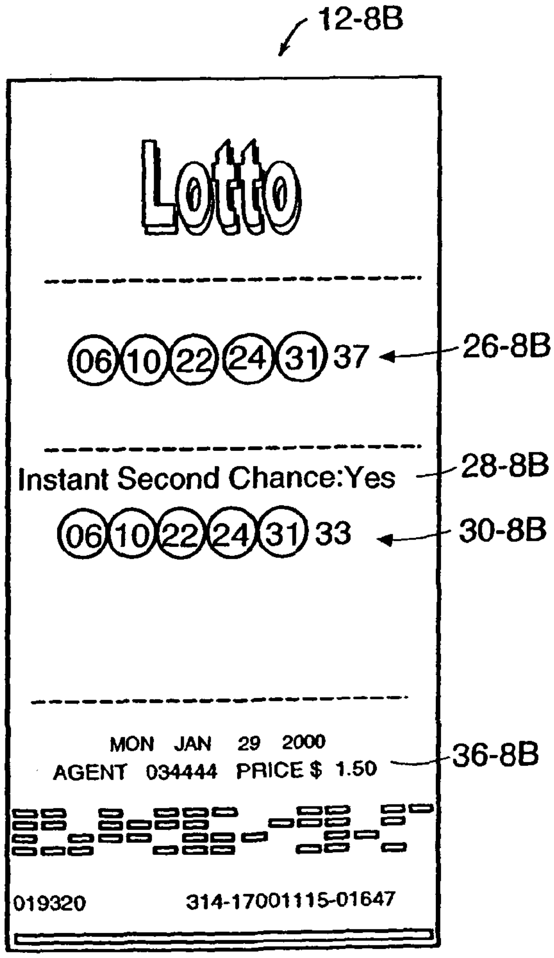

FIGS. 8A and 8B show tickets 12-8A and 12-8B adapted for play of an Instant Second Chance Lotto. A purchase price increase of $0.50 provides play of the optional instant game. The tickets 12-8A and 12-8B both use the word "YES" as a visual indication 28-8A, 28-8B of this selection. The player chooses six numbers in set 26-8A or 8B. The RNG 24 randomly draws the six numbers in the set 30-8A or 30-8B. The first set is used for play in a future lotto drawing, e.g. weekly, and the second set is compared for matches to the first set to play the instant game. The match of all six numbers, as shown in FIG. 8A, produces a substantial prize, e.g. $500,000. FIG. 8B shows the same game as FIG. 8A, except that a match of five of the six possible matches is shown. The prize structure is set that the prize associated with this win is substantially less than for a complete six number match, e.g. $590 for a $1.50 ticket price.

Figure 9:
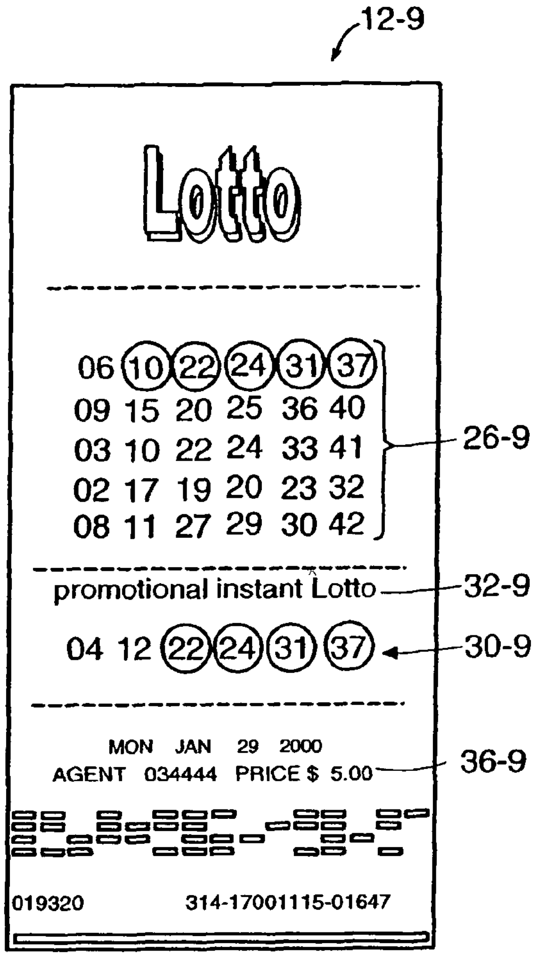

FIG. 9 shows a ticket 12-9 adapted for play of "Promotional Instant Lotto". In contrast to all the preceding embodiments, the instant game illustrated in one example by this ticket 12-9 has no additional cost to the player. The instant game is a promotion for the player to play five groups 26-9 of lotto numbers (five rows of six numbers each, as shown in FIG. 9). The total price 36 of this ticket is $5.00 ($1 for each lotto play). Each group or row of numbers in set 26-9 is chosen by the player and is played both in a future lotto draw and in an instant lotto game. In the instant game, each row of player-chosen numbers is matched to one row 30-9 of numbers drawn randomly by RNG 24. In the instant game, prizes are awarded for matching six, five, four or three numbers in any row with those numbers in row (second set) 30-9. In the illustrated example, the numbers "22", "24", "31", and "37" in the first player-selected row of set 26-9 matches with numbers in row (second set) 30-9. In one exemplary group structure, this instant win of four matches has an associated instant prize of $20.00. Of course, the player then has the opportunity to play five sets of numbers in a later draw.

Figure 10:
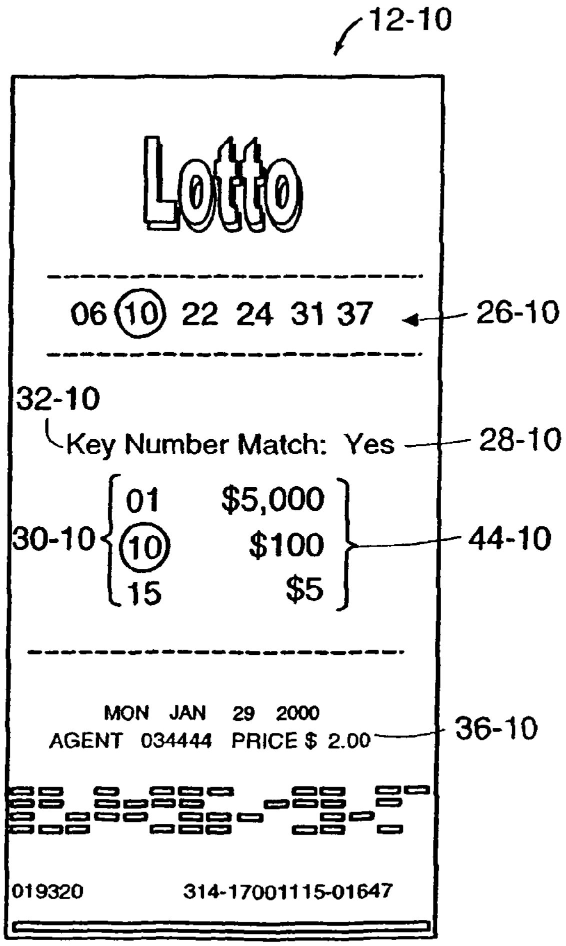

FIG. 10 shows a ticket 12-10 according to the present invention adapted for play of a "Key Number Match" Instant Game as well as a future draw lotto game. The instant game option is played for an additional purchase price of $1.00. The total purchase price 36-10 is $2.00. As shown, indicator 28-10 is the word "YES" following the game name 32-10. The player selects six numbers in set 26-10. These numbers are used for play of a future lotto draw and play of a key number instant game. As in the FIG. 3A-3B embodiments, the set 30-10 of numbers drawn randomly by the RNG 24 are displayed as these "key" numbers each with an associated and displayed prize 44-10. A match of a key number in set 30-10 to any number selected by the player in set 26-10 is a win. As shown, the key number "10" is matched and the instant prize associated with this number is $100. The prize structure can assume the form: $5, $10, $20, $50, $100, $500 or $5,000. There is a higher occurrence of the numbers associated with the prizes of lower value in a manner that generally corresponds to the value of the prize associated with that number for any given play of the game.

Figure 13:
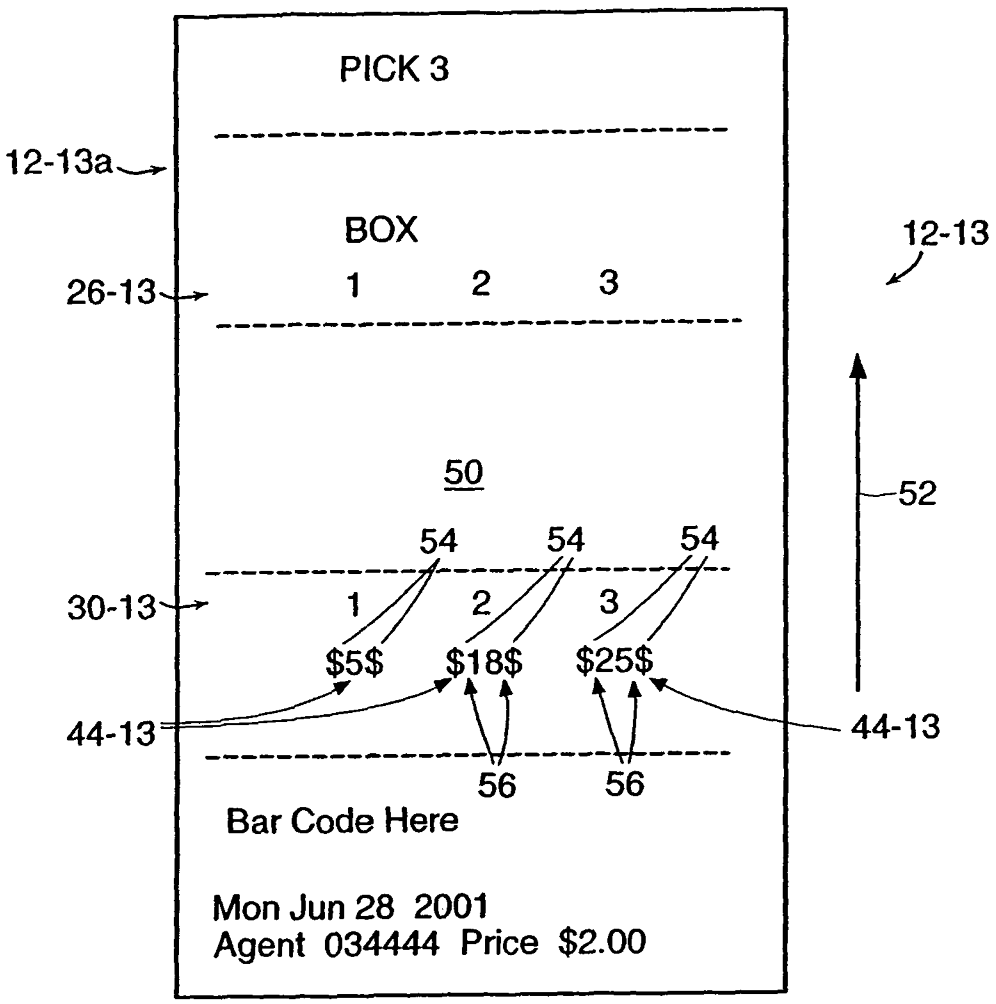
FIG. 13 is a top plan view of a lottery ticket according to the present invention that inhibits retailer fraud in issuing or paying off a winning ticket.

FIG. 13 shows a ticket 12-13 according to the present invention used in the play of an instant numbers game and a future lottery game that includes security features to control retailer fraud. The ticket has a set 26-13 of player selected numbers ("1", "2" and "3" in a horizontal line as shown in the illustrated exemplary Pick 3 format) and a second set 30-13 of randomly generated winning numbers (shown for purposes of illustration only as "1", "2" and "3" in a horizontal line). The word "Box" on the ticket indicates that a win is dependent only on a match between numbers in sets 26-13 and 30-13, not the position or sequence of those matching numbers. Below each number in set 30-13 is a corresponding visual indication 44-13 of the payout for a match of that particular number in set 30-13. As shown, the payout is a dollar amount, $5, $10, and $15, as illustrated. The vertical direction 52, as shown, is along the longitudinal axis of the ticket, transverse to the lines of numbers 26-13 and 30-13.

It is known that a gaming authority agent, typically a retailer who operates a store that houses and operates the terminal 16, can defraud a player by voiding a ticket that turns out to be a winning ticket, keeping it for himself, and then collecting the payout. To counter this possibility, the ticket 12-13 has a space 50 located between the lines of numbers in the sets 26-13 and 30-13. The ticket 12-13 emerges from the terminal in the direction 52 as, or after, it is printed by the terminal. The top end 12-13*a* of the ticket containing the first set 26-13 is visible to the player and/or the retailer while the set 30-13 is still in the terminal and not visible. The size of the space 50, particularly its length in the direction 52, is selected to ensure this sequenced visibility. As a result, the player can see that his or her selected numbers correctly appear on a valid, non-voided ticket 12-13 before either the player or the retailer knows if the ticket wins or loses an instant prize. While the space 50 is shown as a blank, it may display printing as long as this area separates the sets of numbers 26-13 and 30-13 as described above.

A further retailer fraud security feature shown on ticket 12-13 is a set of graphical elements 54, 54 that bracket each visual indication 44-13 of the payout amounts. As shown, these bracketing graphical elements are dollar signs ("$"). The lateral spacing 56, 56 of the dollar signs to the amount is sufficiently close that it is not possible for a retailer paying out on a winning ticket to alter the ticket by inserting an additional number, and thereby increase the paid out amount. The exact form of the graphical elements 54, 54 can vary as long as they are permanent and block an alteration of the amount indication 44-13 to increase its value.

While the prize indication is shown as a dollar amount displayed horizontally, it will be understood that it can be displayed vertically, or at any angle. The prize indication can also be some other symbol of the prize, or translatable into a prize, e.g. one, two or three matching symbols. The bracketing is located with respect to this prize indication in whatever direction and at whatever degree of closeness is consistent with the security objective of avoiding alteration by insertion.

These security features can be used on any ticket 12 of the present invention described herein.

In any of the forms described above in detail, and variations thereof that will occur to those skilled in the art, the game, method and system of the present invention combine the advantages of a future draw lottery and an instant lottery game as a single ticket that can be purchased with one visit to a gaming outlet, terminal, vending machine, website or the like. The game provides increased game interest and value though multiple opportunities to win at different times, through player selection of game pieces (numbers) to be played in both the future and instant games, and through the wide number of variations in the type of games that can be played. The game, method and system of the present invention also make the play of the instant game optional for maximum versatility and compatibility with existing future draw game operations and equipment. The present invention is played on-line with the versatile geographic reach and convenience attendant on-line communications. It does not use conventional printed scratch tickets, or any tickets with concealed information, and avoids the costs, security problems, theft problems, and refuse problems associated with conventional scratch tickets. The present invention also does not sequence play, that is, require the play of an instant game to qualify for play in a future draw game. The game also provides a wide range of prize structures to be implemented so that the likelihood of some win, albeit one with a comparatively small payout, and the possibility of a win with a very large payment can be adjusted to maximize game interest.

While the invention has been described in various embodiments and in conjunction with specific examples of certain of these embodiments, it will be understood that various modifications and alternatives will occur to those skilled in the art. As discussed above, the nature of the terminals 16, the exact nature of the communications network 14, the form of centralized control for the system, and the precise nature of the RNG 24 can assume a variety of forms known in the industry. The ticket 12, also as noted above, can be in the form of a printed ticket of the general type now issued in connection, for example, with a daily or weekly draw game, or can be an on-screen display at a dedicated terminal or pc. "Ticket" as used herein is therefore not used in the limited sense of a printed ticket but in the broader sense of a display of the elements of the game as described and illustrated herein. Game pieces other than Arabic numbers can be used, or used in combination with numbers as described in one illustrative example with reference to the joker 21*a*. The specific instant games described herein can, of course, be modified to include, for example, different numbers of game pieces in one or both of the first and second sets, different numbers of plays (e.g. "rows" or "groups" of game pieces) in either set 26 or 30, and different prizes and prize structures than those described. These and other modifications and variations that will occur to those skilled in the art are intended to fall within the scope of the appended claims.

What is claimed is:

1. A method of facilitating the operation of a future draw wagering game with an optional instant game, comprising:

receiving at a terminal a request to enter a future draw game;

receiving at the terminal a set of entry numbers chosen by a player for the future draw game;

offering the player an opportunity to enter an optional instant game as a supplement to the entry in the future draw game;

receiving an indication that the player will participate in a play of the optional instant game;

responsive to receiving the indication and to receiving the set of entry numbers, randomly generating a set of instant game outcome numbers that, when matched with the entry numbers, indicate the outcome of the instant game, said instant game outcome numbers being uniquely associated with the particular play of the instant game;

displaying to the player at the terminal the player entry numbers and the instant game outcome numbers;

responsive to at least one of the player entry numbers matching at least one of the instant game outcome numbers, paying a prize to the player for the instant game indicated by the matching of the player entry numbers with the instant game outcome numbers;

after displaying the player entry numbers and the instant game outcome numbers, randomly generating draw numbers for the future draw game; and responsive to at least one of the player entry numbers matching at least one of the draw numbers for the future draw game, paying a prize to the player for the future draw game indicated by the matching of the player entry numbers with the draw numbers for the future draw game.

2. The method of claim 1, wherein displaying the player entry numbers and the instant game outcome numbers further includes printing the player entry numbers and the instant game outcome numbers on a ticket and providing the ticket to the player.

3. The method of claim 2, wherein the entry numbers and the instant game outcome numbers are printed on the ticket at the terminal, and wherein the instant game outcome numbers and the entry numbers are visible to the player on the ticket when the ticket is provided to the player.

4. The method of claim 2, further comprising:

determining a predetermined amount of space needed to separate the entry numbers from the instant game outcome numbers so that, when the ticket has been printed at the terminal but not yet provided to the player, the entry numbers are visible to the game player without allowing the instant game outcome numbers to be visible to an agent operating the game terminal; and printing the entry numbers on the ticket separated by at least the predetermined amount of space from the instant game outcome numbers.

5. The method of claim 2, further comprising:

receiving an authentication number from a central server;

printing the authentication number on the ticket prior to providing the ticket to the player;

responsive to receiving a request to redeem the ticket for a prize, transmitting the ticket authentication number from the ticket to the central server; and receiving authorization from the central server to redeem the ticket for the prize prior to paying the prize to the player.

6. The method of claim 1, further comprising:

receiving a payment from the player for the entry in the future draw game;

receiving an additional payment from the player for the entry in the instant game.

7. The method of claim 1, further comprising:

receiving a payment from the player for the entry in the future draw game;

responsive to the player purchasing a predetermined quantity of entries in the future draw game, providing the player with a free play in the instant game.

8. The method of claim 1, further comprising:

transmitting the player entry numbers to a central computer via a network;

transmitting the indication that the player desires to enter the supplemental instant game to the central computer;

responsive to transmitting the indication, receiving the instant game outcome numbers from the central computer.

9. The method of claim 1, further comprising:

responsive to the player declining to play the optional instant game, displaying an announcement of the option to play the optional instant game on a future draw ticket provided to the player.

10. The method of claim 1, wherein the offering the player an opportunity to enter an optional instant game as a supplement to the entry in the future draw game is made responsive to the player's request to enter the future draw game.

11. The method of claim 1, further comprising:

receiving a playslip at the terminal, the playslip indicating the player selected numbers and the indication that the player wishes to enter the optional instant game.

12. A system for facilitating the operation of a future draw wagering game with an optional instant game, comprising:

a central computer;

a network;

a terminal in communication with the central computer via the network;

an input device at the terminal configured to receive a request to enter a future draw game and a set of entry numbers chosen by a player for the future draw game and an indication that the player will enter a play of an optional instant game, the terminal configured to transmit the indication and the entry numbers to the central computer responsive to their receipt at the input device;

the central computer configured to randomly generate instant game outcome numbers responsive to receiving the indication that the player will enter the optional instant game, and to transmit the instant game outcome numbers to the terminal, said instant game outcome numbers being uniquely associated with the particular play of the instant game;

an output device at the terminal, the output device configured to display the entry numbers and the instant game outcome numbers received from the central computer to the player;

the terminal further configured, responsive to at least one of the entry numbers matching at least one of the instant game outcome numbers, to pay a prize to the player indicated by matching of the player entry numbers with the instant game outcome numbers;

a random number generator configured to randomly generate draw numbers for the future draw game after the display of the entry numbers and the instant game outcome numbers; and the terminal further configured, responsive to at least one of the player entry numbers matching at least one of draw numbers, to pay a prize to the player indicated by matching of the player entry numbers with the draw numbers.

13. The system of claim 12, further comprising:

a printer, the terminal configured to display the entry numbers and the instant game outcome numbers by printing them on a ticket at the printer.

14. The system of claim 13, wherein the printer is configured to print the ticket so that, after the ticket has been printed but before the ticket has been provided to the player, the entry numbers are visible to the customer while the instant game outcome numbers are concealed by the terminal from an agent operating the terminal.

15. The system of claim 13, wherein the central computer is configured, responsive to receipt of the entry numbers, to generate an authentication number and to transmit the authentication number to the terminal;

the printer is configured to print the authentication number received at the terminal on the ticket prior to the ticket being provided to the player;

the input device is configured, incident to a request to redeem the ticket for a prize, to receive the authentication number from the ticket;

the terminal is configured to transmit the authentication number received by the input device to the central computer; and the central computer is further configured to, responsive to receipt of the authentication number and conditioned on the authentication number indicating the ticket is a valid prizewinning ticket, to transmit an authorization to redeem the ticket for the prize to the terminal.

16. The system of claim 12, wherein the terminal is further configured to receive a payment from the player for entry in the future draw game and an additional payment from the player for entry in the instant game.

17. The system of claim 12, further comprising:

the terminal is configured to receive a payment from the player for entry in the future draw game;

the central computer is configured, responsive to the player purchasing a predetermined quantity of entries in the future draw game at the terminal, to cause the player to be provided with a free play in the instant game.

18. The system of claim 12, wherein the input device further includes a playslip reader configured to read the entry numbers and the indication the player will enter the optional instant game from a playslip presented by the player.

19. The method of claim 1, further comprising:

displaying a visual indicator showing that the player will player the optional instant game.

20. The system of claim 12, wherein the output device is configured to provide a visual indicator showing that the player will play the optional instant game.

* * * * *